US012664701B1

(12) United States Patent
Seyfioglu et al.

(10) Patent No.: US 12,664,701 B1
(45) Date of Patent: Jun. 23, 2026

(54) FEW-SHOT ITEM INPAINTING IN INPUT IMAGES

(71) Applicant: Amazon Technologies, Inc., Seattle, WA (US)

(72) Inventors: Mehmet Saygin Seyfioglu, Seattle, WA (US); Karim Bouyarmane, Seattle, WA (US); Suren Kumar, Seattle, WA (US); Amirhossein Tavanaei, Mason, OH (US); Ismail Baha Tutar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 479 days.

(21) Appl. No.: 18/121,418

(22) Filed: Mar. 14, 2023

(51) Int. Cl.
| | |
|---|---|
| *G06T 11/60* | (2026.01) |
| *G06F 40/126* | (2020.01) |
| *G06F 40/284* | (2020.01) |
| *G06F 40/40* | (2020.01) |
| *G06T 5/77* | (2024.01) |

(52) U.S. Cl.
CPC ............ *G06T 11/60* (2013.01); *G06F 40/126* (2020.01); *G06F 40/284* (2020.01); *G06F 40/40* (2020.01); *G06T 5/77* (2024.01); *G06T 2200/24* (2013.01); *G06T 2207/20081* (2013.01); *G06T 2207/20084* (2013.01); *G06T 2207/20092* (2013.01)

(58) Field of Classification Search
None
See application file for complete search history.

(56) References Cited

U.S. PATENT DOCUMENTS

2021/0287430 A1* 9/2021 Li ............................ G06T 7/74

OTHER PUBLICATIONS

Ho et al., "Denoising Diffusion Probabilistic Models", Dec. 6-12, 2020, Advances in Neural Information Processing Systems, Curran Associates, vol. 33, pp. 6840-6851 (Year: 2020).*
Avrahami et al., "Blended Diffusion for Text-Driven Editing of Natural Images", Jun. 18-24, 2022, Proceedings of the IEEE/CVF Conference on Computer Vision and Pattern Recognition (CVPR), pp. 18208-18218 (Year: 2022).*
Rombach et al., "High-Resolution Image Synthesis With Latent Diffusion Models", Jun. 18-24, 2022, Proceedings of the IEEE/CVF Conference on Computer Vision and Pattern Recognition (CVPR), pp. 10684-10695 (Year: 2022).*
Wu, "Creative Painting with Latent Diffusion Models", Oct. 12-17, 2022, Proceedings of the 2nd Workshop on When Creative AI Meets Conversational AI (CAI2), Coling 2022, pp. 59-80 (Year: 2022).*

* cited by examiner

*Primary Examiner* — Kent W Chang
*Assistant Examiner* — Jonathan M Cofino
(74) *Attorney, Agent, or Firm* — K&L Gates LLP

(57) ABSTRACT
Techniques are generally described for item inpainting in images using a small number of reference images without 3D models. In various examples, a first selection of a first item may be received. In some further examples, a first set of weights learned for a generative latent representation model fine-tuned using at least one image of the first item may be determined. In some cases, first user-input image data representing a target environment may be received. In various examples, the generative latent representation model may generate, using the first set of weights, first output image data representing a representation of the first item within the target environment.

20 Claims, 8 Drawing Sheets

700 ⟍

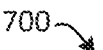

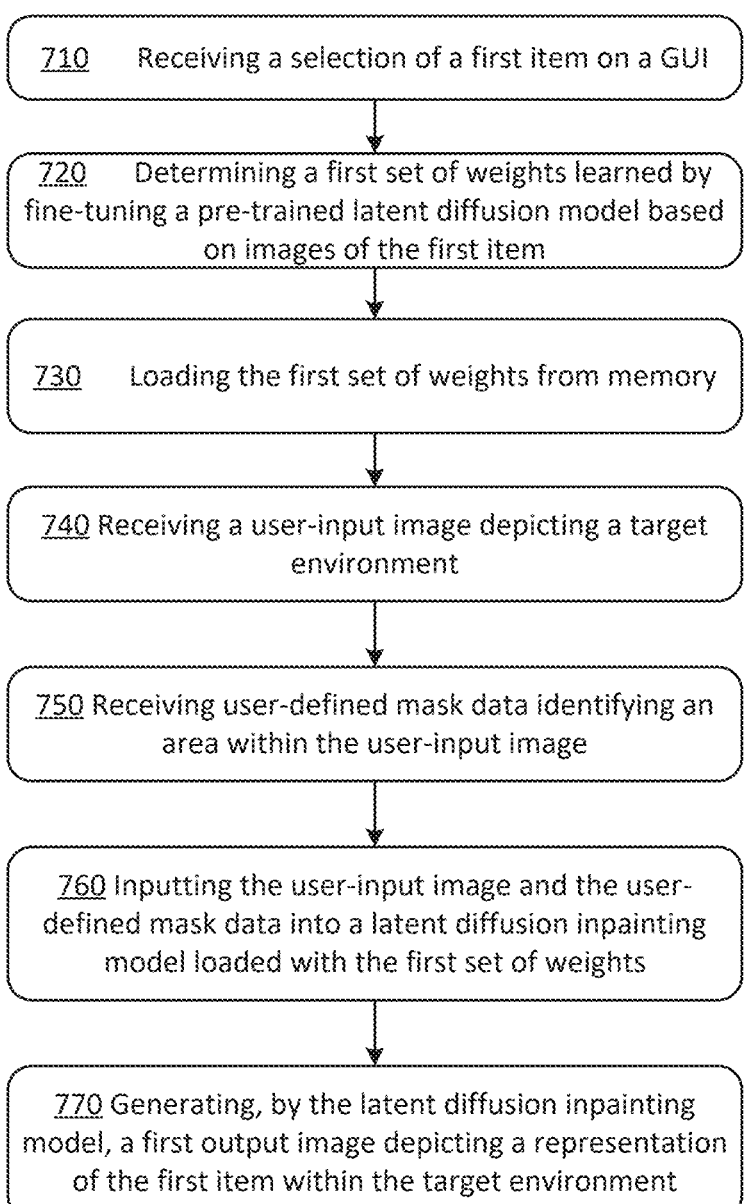

700

| |
|---|
| 710    Receiving a selection of a first item on a GUI |

| |
|---|
| 720    Determining a first set of weights learned by fine-tuning a pre-trained latent diffusion model based on images of the first item |

| |
|---|
| 730    Loading the first set of weights from memory |

| |
|---|
| 740 Receiving a user-input image depicting a target environment |

| |
|---|
| 750 Receiving user-defined mask data identifying an area within the user-input image |

| |
|---|
| 760 Inputting the user-input image and the user-defined mask data into a latent diffusion inpainting model loaded with the first set of weights |

| |
|---|
| 770 Generating, by the latent diffusion inpainting model, a first output image depicting a representation of the first item within the target environment |

FIG. 7

FEW-SHOT ITEM INPAINTING IN INPUT IMAGES

BACKGROUND

Computer-based virtual design and/or try-on systems often attempt to display visual representations of items in different contexts or environments. For example, in a virtual try-on context, a user may wish to see how a particular jacket would appear if matched with a certain pair of pants. In a virtual design scenario, a user may wish to see how a certain piece of furniture appears within a particular furnished or non-furnished room. In some examples, virtual, augmented, and/or mixed reality interfaces may be used to realistically render three dimensional models of items in different environments/contexts.

BRIEF DESCRIPTION OF DRAWINGS

FIG. 7 is a block diagram illustrating an example process for few-shot item inpainting in input images, in accordance with embodiments of the present disclosure.

DETAILED DESCRIPTION

Figure 1:
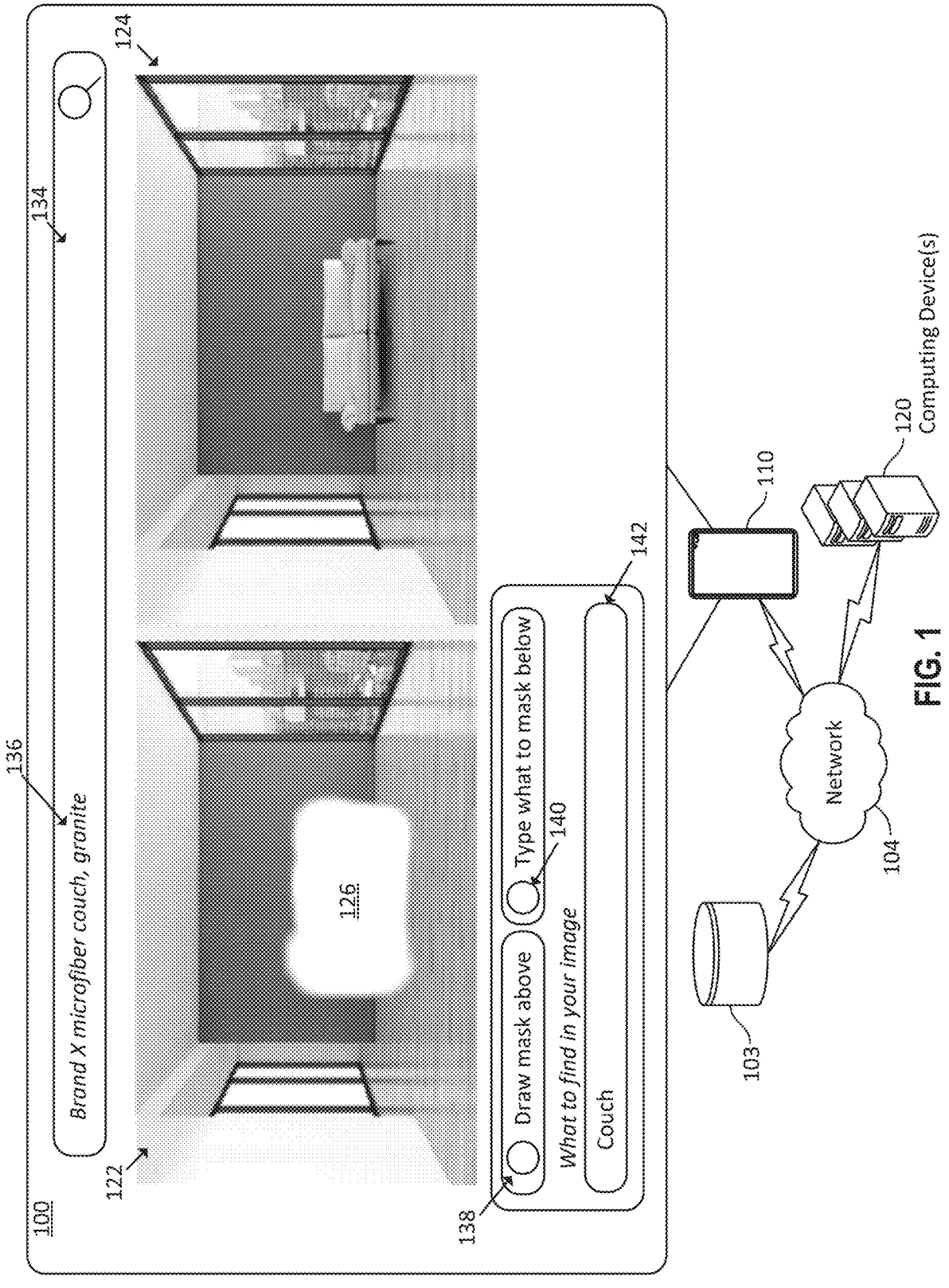
FIG. 1 depicts an example graphical user interface that may be used for few-shot item inpainting in input images, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Virtual "try-on" refers to a scenario in which a user is able to view a virtual object displayed in an image of a real-world environment. For example, in the context of clothing, a user may have an image of a particular dress and may want to see how the dress would look on them or with one or more other articles of clothing that the user is considering for an outfit. In this example, because the dress is a virtual item the user cannot simply try on the dress and see the result. In another example, virtual try-on may be used to see how furniture or other objects might appear within a user's room. For example, a user may want to see how a given arm chair looks in the user's living room (e.g., together with the rest of the user's furniture in that room). In some examples, in virtual try-on, the user may want to replace one item (e.g., a real world item) with the virtual item. For example, the user may want to replace the t-shirt that they are wearing with a user-selected virtual t-shirt. In another example, the user may want to replace their real refrigerator with a virtual refrigerator that they are considering for purchase.

In some other examples, a long-standing problem in online interfaces (such as e-commerce interfaces) is the ability of users to try-on items prior to purchase. The lack of try-on possibility increases the risk and cost associated with items returns due to misfit of the item after the item is delivered and physically tried on. In addition, the problem may result in user dissatisfaction and/or user's avoidance of the online interface entirely for obtaining certain classes of items (e.g., clothing, jewelry, furniture). Virtual try-on may be used in other contexts beyond furniture and clothing. For example, virtual try-on may be used to render graphics taken from one setting in another setting (e.g., to add artwork on a blank wall) and/or to import a character or other virtual object into a video game. In general, virtual try-on may be used in any context in which a virtual item (e.g., image data representing a virtual item) is rendered in another image and/or setting.

One solution to provide a virtual try-on experience is to use augmented-reality, mixed reality, and/or virtual reality through three-dimensional (3D) modeling. Such solutions, however, typically employ a 3D model of the item and/or use a computationally-expensive method to reconstruct a 3D model from high-quality 2D images of the item. The vast majority of online item databases do not have 3D models associated with them (either native or reconstructed). As a result, the augmented reality (AR) and/or mixed reality (MR) based virtual try-on capability is typically only offered for a small portion of available items. Additionally, when new items are on-boarded, 3D models need to be generated or otherwise provided in order to provide an AR-based or MR-based virtual try-on experience.

Described herein are techniques for virtual try-on that do not require 3D modelling, augmented reality, or mixed reality. Instead, the virtual try-on systems and techniques described herein use only available 2D images of an item (e.g., available item images available in an online catalog).

The systems and techniques described herein use few-shot learning to fine-tune a pretrained latent diffusion inpainting model or other pretrained generative inpainting model. "Few shot" in this context refers to fine-tuning the pre-trained latent diffusion inpainting model (or other generative inpainting model) using a small number of images of an item. For example, few shot learning may be used to fine-tune a pretrained latent diffusion inpainting model using the available images of an item from a catalog entry for that item. Inpainting is a digital image processing technique that may be used to replace one portion of an existing image with other image data. For example, inpainting may be used to restore or reconstruct missing or damaged parts of photographs. In this context, inpainting may include replacing the relevant part of the image with new plausible image data (e.g., pixel values) based on the surrounding pixels or other information. In the virtual try-on context, inpainting involves replacing a portion of the image with image data representing the subject item (e.g., a virtual article of clothing, piece of furniture, etc.). Ideally, inpainting is performed such that the virtual item appears naturally within the image (e.g., based on prevailing illumination conditions, etc.).

In various examples described herein, a user may provide an input 2D image of a desired environment in which the virtual item should be displayed. In the case of virtual try-on of clothing, the input 2D image may be an image of the user. In the example of furniture, the input image may be the room in which the user is considering placing a new furniture item. In a decorative example, the user may provide an image of a place where they are considering placing the decorative item (e.g., the user's wall, a user's desk, etc.). The user can then specify a rough location within that image where they would like the item to be displayed. The various systems and techniques described herein may generate an output image that realistically displays the item seamlessly integrated within the environment at the specified location. In contrast to previous machine learning based inpainting approaches, the various models described herein are not constrained by the images (or number of images) of the item that are available. From the available images (e.g., as few as a single image) the various machine learning techniques described herein may intelligently extrapolate new angles for positioning of the virtual item, to the extent such angles are necessitated by the constraints of the environment and/or the user-specified location and/or orientation for the virtual item in the environment.

Image generation using diffusion-based models typically preserve only one input: either the item (e.g., the virtual item) is preserved and the environment surrounding the item is generated with text-guidance (e.g., Dreambooth) or the environment is preserved and the item within the environment is generated with text-guidance (Inpainting-like). The various systems and techniques described herein are configured to preserve both the virtual item and the target environment (e.g., a user-uploaded image) with a high degree of fidelity to the original model inputs.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead receive a set of images of objects as input. In various examples, the images may represent items that are arranged together in an environment. For example, a room with one or more furniture items and/or other characteristics (e.g., floor type, wall paint color, wallpaper patterns, with different artwork, etc.) may be decomposed into individual images of each item and/or a subset of the items in the room. In some examples, the set or subset of items in the room may be detected using an object detector. A backbone network (e.g., a convolutional neural network) may be used to generate feature embeddings representing the individual item images and the scene images including all of the items arranged together. These embeddings may be input into a transformer encoder along with positional embeddings describing a spatial position of each of the items within the room (e.g., within the frame of image data). As described in further detail below, the transformer may generate output embeddings comprising visual representations of items that are visually complementary to the room and the input items. In some cases, vision transformers may be used that generate patches of input images. Likening the vision transformer to the natural language task, such image patches may then serve as "visual words." Additionally, with vision transformers, a backbone network need not be used and the raw pixel values of the input images may be directly input into the model.

In general, the encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings.

The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 depicts an example graphical user interface (GUI) 100 that may be used for few-shot item inpainting in input images, in accordance with various aspects of the present disclosure. It should be noted that the graphical user interface 100 is shown for illustrative purposes only and is merely one example of an interface that may be used to provide few-shot item inpainting in input images. However, other user interfaces may be used in accordance with the desired implementation.

In various examples, one or more computing devices (e.g., including computing device(s) 120, mobile device 110, etc.) may be used to implement the few-shot item inpainting systems described herein. In various examples, the one or more computing devices implementing the few-shot item inpainting systems may be configured in communication over a network 104. Network 104 may be a communication network such as a local area network (LAN), a wide area network (such as the Internet), or some combination thereof. The one or more computing devices implementing the few-shot item inpainting system may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

GUI 100 includes a search field 134 that may be used to search for various items (e.g., via an online search engine). In some examples, upon selection of an item (e.g., a virtual item for virtual try-on), the name of the item may be displayed. In the example in FIG. 1, the name of the virtual item 136 is "Brand X Microfiber Couch, Granite." As previously mentioned, virtual try-on (and the few-shot item inpainting systems used to provide virtual try-on, as described herein) may be used in any desired context.

In the example GUI 100, a field may display a user-input image 122. The GUI 100 may prompt the user to provide an input image for the virtual try-on experience. For example, the user may select an image from their computer, an image downloaded from the internet, an image frame captured by a camera of the user's mobile device 110, etc. The user-input image may be the image in which the user-selected virtual item will be inpainted by the few-shot item inpainting system. Accordingly, the image may display the target environment in which to display a representation of the virtual item.

The GUI 100 may display selectable graphical controls 138 and 140 that may enable the user to specify how the user would like to indicate a mask for the user-input image 122. A mask, in the context of inpainting, refers to a target area in the image where the inpainted image data (e.g., the virtual item) should be displayed. Note that the generative machine learning models described herein (e.g., generative latent representation models, such as latent diffusion models) do not employ a naïve approach where pixel values are simply copied from the image of the virtual item and pasted in the target image at a position corresponding to the mask. Instead, the various few-shot inpainting systems and techniques described herein learn to realistically position a new representation of the virtual item within the scene at an area roughly corresponding to the mask in a way that appears natural within the scene.

Selectable graphical control 138 enables the user to draw or otherwise select an area within the user-input image 122 for the mask 126. For example, if there is an existing couch within the room that the user is interested in replacing with the Brand X microfiber couch in the granite color, the user may draw a mask that roughly corresponds to the existing couch. Selectable graphical control 140, by contrast, enables the user to type (or speak) a textual description of the area/object to be masked. The various systems and/or techniques described herein may use a semantic segmentation approach and/or another machine learning approach to detect various objects represented within an image. Additionally, in a separate example of a user interface that may be used in accordance with the various inpainting techniques described herein, a user-uploaded image may be input into a semantic segmentation-based classifier (and/or other object detector) that may be used to classify recognized objects within the image. For example, if the user uploads an image of the user's living room, various furniture objects, decorative items, etc., may be detected. In a semantic segmentation-based approach, a segmentation mask corresponding to each separate detected object may be determined. Thereafter, if the user wants to see what a newly-selected item would look like in place of an existing item in the image (e.g., swapping out the user's couch in the image for a couch that the user has selected in an online database), the user may simply select the detected couch in the image. The segmentation mask for the selected couch may be used as the mask 126 and inpainting may be performed as described herein to inpaint the virtual couch within the image of the user's living room.

For example, a Contrastive Language-Image Pre-training (CLIP) neural network (or similar) may be used to detect various classes of objects within the image. Embeddings generated using CLIP may allow for an input image (e.g., the user-input image 122) and text (e.g., the user-description of the area/item to be masked (typed in text field 142)) to be compared and/or matched using a common representation (e.g., feature representations of the image and text in a shared vector space). For example, given the user-input image 122 and the user input text (e.g., "couch" in text field 142), CLIP may locate the area of the image that has the highest degree of similarity (in the shared embedding space) to the embedding for the text "couch." It should be noted that other object detection frameworks and/or image captioning frameworks may be used instead of CLIP for the text-based masking functionality, as desired.

Although not shown in FIG. 1, in some examples, there may be other fields and/or selectable graphical controls in the GUI 100. For example, a text field may allow the user to refine and/or specify preferences for the output image (e.g., the image 124 in which the selected virtual item is inpainted into the user-input image 122) to refine the appearance of the output image. This is described in further detail below.

Once the user has selected the virtual item (e.g., the "Brand X microfiber couch, granite") and has provided the user-input image 122, the few-shot item inpainting system (described in further detail below) may generate output image 124 that inpaints a representation of the user-selected virtual item in the user-input image 122 while preserving high fidelity characteristics of both the user-selected virtual item and the environment of the user-input image 122. Generally, the few-shot item inpainting system used to provide this virtual try-on experience uses a pre-trained latent diffusion model that is fine-tuned using a few images of the relevant item (e.g., the Brand X microfiber couch, granite). The weights learned for the specific virtual item are stored in memory in association with a unique identifier for the virtual item. Thereafter, when a user selects the virtual item for virtual try-on, the learned weights for that item are retrieved using the unique identifier for the virtual item, and are loaded for the latent diffusion inpainting model. The latent diffusion inpainting model, fine-tuned for the specific virtual item, may then receive the user-input image 122 and the mask data as inputs and may render a representation of the virtual item within the target environment (provided by the user-input image). Optionally, a text encoder may be used to condition the generated image on user-provided text which may be used to further refine the generated image according to user preference. These and other techniques are described in further detail below.

Figure 2:
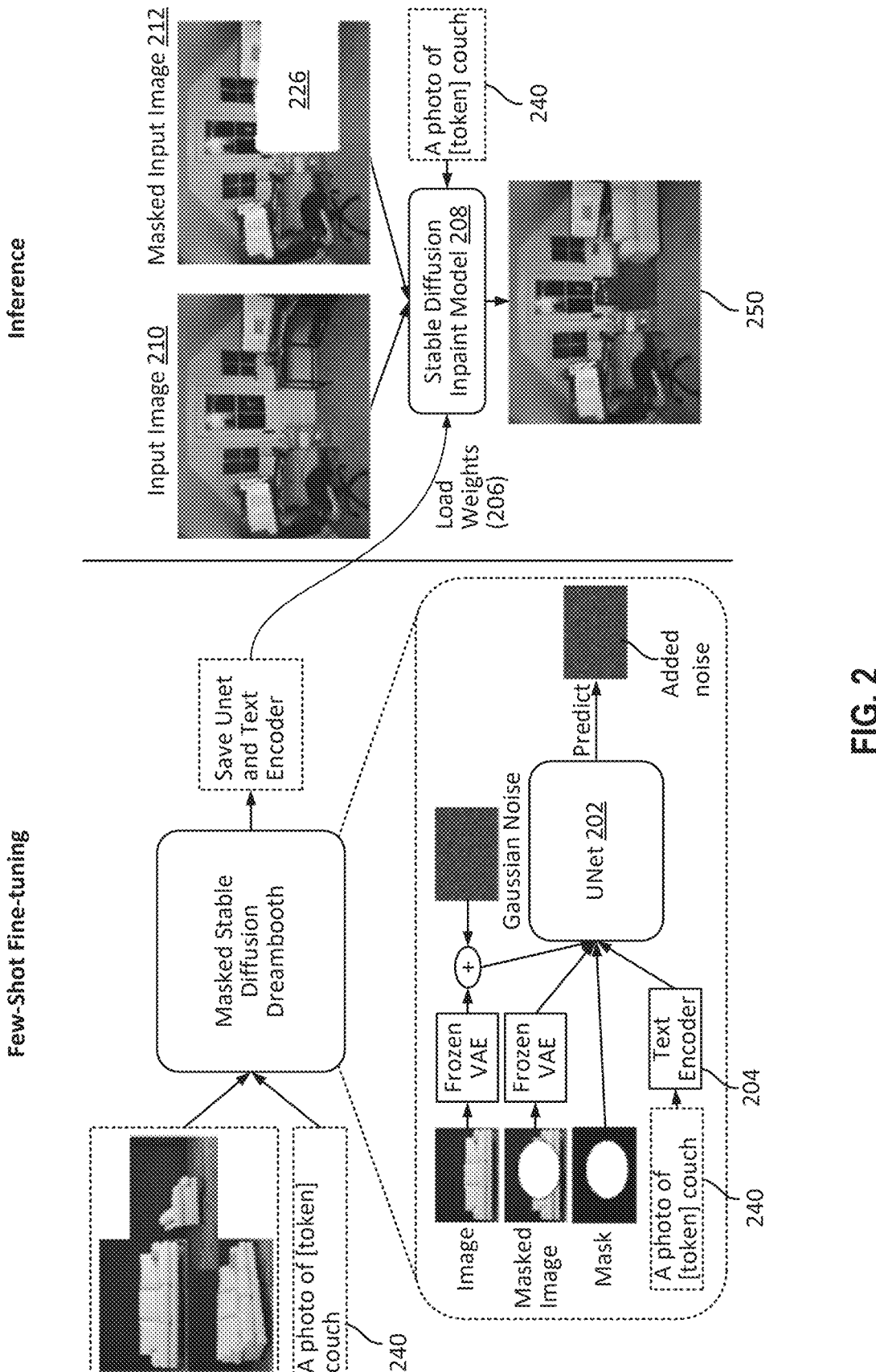
FIG. 2 depicts an example machine learning architecture for few-shot item inpainting, in accordance with various aspects of the present disclosure.

FIG. 2 depicts an example machine learning architecture for few-shot item inpainting, in accordance with various aspects of the present disclosure. FIG. 2 describes training and inference for a few-shot item inpainting model that solves problems with existing inpainting and/or virtual try-on approaches, as described in further detail below.

Text-to-image diffusion models have shown unprecedented success in their ability to generate images conditioned on input text. When trained with large-scale datasets of image and text pairs, these models can generate highly accurate, and semantically meaningful images utilizing text prompts, especially for common objects (e.g., objects that are well-represented in the training data).

Latent diffusion models are generative models that may be trained to generate data similar to the data on which they are trained. Latent diffusion models work by injecting Gaussian noise into training data and learning to recover the original training data by reversing the noising process. More specifically, a latent diffusion model is a latent variable model that maps inputs to the latent space using a fixed Markov chain. The Markov chain gradually adds more noise until the input is asymptotically transformed into pure Gaussian noise. The goal of training the latent diffusion model is the reverse process—in order to be able to generate data of interest from noisy input. Latent diffusion models may outperform and/or offer advantages other image generative machine learning techniques (notably adversarial networks). Additional information on latent diffusion models is provided below.

Diffusion models can be further trained for personalization tasks such as inpainting. Natural language inputs may provide beneficial guidance for inpainting of common objects that are well-represented in the training data. However, for uncommon objects, such as the items found in large e-commerce catalogues, these models generally fail to generate a satisfactory representation of the item (the virtual item) by preserving its characteristic details (e.g., prints, patterns, textures). Moreover, even in the cases where the model has a generative capacity for the given object, text descriptions are highly ambiguous by their nature and are inefficient in conveying the characteristic details of an object. Thus, the various techniques described herein use image-based diffusion guidance (which may be optionally coupled with text-based guidance) for the inpainting tasks.

Paint by Example (PBE) is an example of an image-guided latent diffusion model, which utilizes an exemplar image to guide the diffusion inpainting process. The method achieves superior performance against text-guided inpainting models like Stable Diffusion or harmonization models such as DCCF (Deep Comprehensible Color Filter learning) for in-the-wild object inpainting. However, the PBE method also has some drawbacks in preserving the high-fidelity details of objects, especially for the underrepresented objects, as PBE embeds the exemplar image of the object using only CLIP's CLS embedding token for guidance. Relying on such high-level embeddings results in omitting fine-grained details that define the characteristics of many items and thus are not suitable for a virtual try-on task.

Another recent technique called DreamBooth offers high-fidelity concept learning on novel images. Given a few reference images (ideally provided from different angles), a new token representing these reference images could be injected in the model by few-shot fine-tuning the model's denoiser. Accordingly, DreamBooth is able to generate highly-realistic images of a virtual item, but in DreamBooth the background of the generated images is hallucinated by the model. There is no way in DreamBooth to preserve a desired background and thus, without modification, DreamBooth is ill-suited to the virtual try-on task. This is because, in virtual try-on, a user is interested in seeing the virtual item as it would appear in the user-input image (not in a random setting).

Shown and described in FIG. 2 is an example implementation of a few-shot item inpainting machine learning architecture that may be used to provide virtual try-on (as described herein). Although a latent diffusion architecture is shown and described, it should be noted that other generative architectures may instead be used, in accordance with the desired implementation. For ease of reference, the architecture in FIG. 2 may be referred to herein as "Dreampaint."

In various examples, a pre-trained latent diffusion model (e.g., pre-trained Stable Diffusion) may be used to make the new concept (e.g., the virtual item) learned using Dreambooth suitable for inpainting. The Dreambooth approach is modified into masked training few-shot fine-tuning to learn a new UNet 202 and text encoder 204 that are injected (e.g., stored in non-transitory computer-readable memory) in association with identifier data uniquely identifying the new item. Upon selection of an item (e.g., the couch depicted in FIG. 2), the learned weights for the fine-tuned UNet 202 and text encoder 204 are loaded (action 206) into a pre-trained latent diffusion inpainting model 208 (e.g., pre-trained Stable Diffusion), which allows the user to mask a portion of their user-input images and generate the injected virtual item in the masked region by preserving both the item-specific high-fidelity features as well as the context of the user-input scene (e.g., input image 210).

Furthermore, DreamPaint can determine a masked region (e.g., masked region 226 of masked input image 212) using a text prompt, as previously described in reference to FIG. 1. However, if the returned masked region 226 is unsatisfactory for the user, the model has the flexibility to be further refined by additional text prompts. Accordingly, DreamPaint may leverage both image and text guidance.

Latent Diffusion Models

Diffusion models are generative models that learn the data distribution by reversing a fixed-length Markovian forward process, thereby iteratively denoising a normally distributed variable. In some cases, instead of using the pixel space, denoising can be conducted in a latent space, which is computationally efficient as it reduces the dimension of images. Additionally, use of the latent space omits the high frequency noise within the given image. One example of a latent diffusion models is Stable Diffusion, which includes three main components: A Variational Autoencoder (VAE) to transform the given input in a latent space, a text encoder to process the given text on which image generation is conditioned, and a time-conditioned UNet to predict the noise that is added on the image latents which is conditioned by the text embeddings. Mathematically, the conditioned latent diffusion model can be learned by optimizing the following loss:

$$L_{LDM} = \mathbb{E}_{\varepsilon(x),c,\epsilon,t}\left[\|\epsilon_\theta(z_t, t, c) - \epsilon\|_2^2\right]$$

where, $z_t$ is the latent version of the input $x_t$ provided by the VAE as $z = \varepsilon(x)$. $x_t$ is the noise added version of the input x, at a timestep of t, where $x=\alpha_t x_0+(1-\alpha_t)\epsilon$ and $\alpha_t$ decreases with the timestamp t. Noise is denoted by $\epsilon \sim \mathcal{N}(0,1)$. $\epsilon_\theta$ is the UNet 202. Lastly, c denotes the conditioning variable, and for the text guided models, it is given by processing the given text with the CLIP text encoder.

Image Inpainting

For the inpainting task, the objective may be defined as follows: Given an image x, a binary map of edit region m (where edit region pixels are 1), and a reference image (or images), r, the objective is to generate an output image, where the edited region given by m is as similar as possible to r, and regions defined by $\mathbb{1}-m$ remains as unchanged as possible, where $\mathbb{1}$ denotes an all-ones matrix. However, the objective is not to just copy-paste the given reference image in the mapped region, but to do so in as plausible and realistic a way as possible. Preserving the reference image's features is especially important in the virtual try-on setting. For the inpainting, the objective can be defined mathematically by:

$$L_{LDM}=\mathbb{E}_{\varepsilon(x),c,\epsilon,t}[\|\epsilon_\theta(z_t,\varepsilon(\mathbb{1}-m)\odot x),m,t,c)-\epsilon\|_2^2] \quad (2)$$

Here, as shown in FIG. 2, UNet 202 takes two additional inputs in addition to input latents: VAE-processed masked image (e.g., "masked latents"), and the mask itself. Stable Diffusion has an inpainting model which was trained on laion-aesthetics v2.5 using classifier-free guidance, where during training, synthetic masks are generated to mask 25% of the pixels, which in turn conditions the model for inpainting.

Paint by Example (PBE)

As previously described, the text-conditioned inpainting is generally not enough to embed fine-grained details that define the reference virtual items especially when preserving the virtual item's fidelity is the main priority. Thankfully, the conditioning of the latent diffusion models are not limited to textual prompts but they can also be guided by images. However, it is not straightforward to condition the diffusion models on images as the model generally tends to copy the object given in r as is, instead of blending it with the x. More precisely, if c in Eq. 2 is selected as image, whose embeddings are given by the CLIP image encoder, the model just learns the trivial mapping function, where, $(1-m)\odot x+r=x$. PBE introduced a number of design choices to tackle the trivial mapping problem. Instead of utilizing all image tokens that CLIP image encoder outputs, PBE leverages only the CLS token, which helps preserving semantics while preventing the trivial solution. However, the general nature of the CLS token results in omission of fine-grained virtual item details. Furthermore, PBE adds fully connected layers to decode the CLS token, and inject the decoded CLS token into the UNet.

Dreambooth

Instead of providing a reference image during inference time, Dream-booth aims to inject a novel concept (e.g., a new virtual item) into the diffusion model in a few shot fine-tuning setting. This is achieved by fine-tuning the UNet with a few reference images of the object, and a prompt in a format of "a [unique token] [class noun]", where [unique token] is a word (e.g., token data) that does not have a strong prior in both the text encoder (e.g. a random word like nbsn) and the diffusion model. [class noun] is the class of the reference images, which is used to limit the model's prior of the reference image's class. This way, the diffusion model learns this unique object and its identifier, and thus may leverage its visual prior to generate the object in novel poses on different backgrounds. This is achieved by fine-tuning Eq. 1 with a few reference images using the same conditioning vector of "a [unique token] [class noun]". If the reference images are provided from different poses, it may greatly improve the model's ability to generate the concept in novel views.

UNet 202 may include an encoder and a decoder in a segmentation network with skip connections. UNet 202 may be used for the task of semantic instance segmentation. In other words, UNet 202 may classify objects and, in addition, may detect locations of individual instances of detected objects (as distinguished from one another), even when such instances are contiguous in the two-dimensional frame of pixels. There are challenges with fine-tuning the entire UNet 202 of Stable Diffusion with a few images. Two example issues include Language-Drift and overfitting. Language-Drift is the phenomenon of associating the reference images with the given class noun. For example, if a picture of a t-shirt is used as a reference with a prompt "a nsbn tshirt", then the model forgets its generalized understanding of a t-shirt and associates the reference image t-shirt. However, this is not really an issue for the virtual try-on setting since the goal is not to preserve the model's generalization capacity over the reference class, but to teach it the specific reference (e.g., the specific virtual item) by keeping its fidelity as high as possible. To address the Language-Drift issue in Dreambooth, a loss function called "class specific prior preservation loss" is used to help prevent overfitting. This loss function uses both the provided reference images and the model's own generated samples for a specific class noun. The purpose of this loss function is to prevent the model from forgetting how to generalize for the specific class noun, which is a problem known as "catastrophic forgetting." However, since the objective in virtual try-on is not to keep the class token generalizable, this loss function does not achieve significant benefit. Moreover, for an e-commerce virtual try-on setting, this loss function also often leads to sub-optimal results as most of the e-commerce items are novel with respect to one another.

DreamPaint

It is highly likely that the textual conditioning alone is not enough to embed the high-fidelity content of catalog images of unique virtual items, as catalog titles are not meant to fully describe the item in detail. Especially high-fidelity items (e.g., clothing with particular attributes and/or prints) can hardly be described by textual prompts only, thus it is clear that a visual reference is needed. Furthermore, pre-trained models do not have strong priors over many of the catalog items, as they are not represented in the bulk datasets compared to other natural images like animals, faces, etc.

Using only global embeddings in PBE results in omission of high-fidelity details of the reference image (e.g., the image of the virtual object), which makes PBE unsuitable for the virtual try-on inpainting setting, especially for the items for which the model has a low prior. As users would like to see the item as similar as possible as given in the catalog, Dreambooth approach seems more plausible. However, the original Dreambooth does not support inpainting and thus the user-input environment is not preserved by Dreambooth.

As shown in FIG. 2, a Masked latent diffusion model is first introduced (e.g., masked Stable Diffusion Dreambooth) to introduce the new virtual items to the diffusion model by providing a number of various poses of the item alongside a new identifying token (e.g., item identifier data that is unique to the item). This identifier data is represented by "[token]" in FIG. 2. During training, with equal probability, image latents are masked (e.g., randomly-masked where different positions for the mask are selected at random within the image frame) either with rectangular and elliptic masks (since these are the most common mask shapes used by users, although any desired mask shape may be used without limitation). In addition, object-shaped masks may be generated using the ClipSeg model (or another segmentation model) along with the class noun of the object (e.g., a general category of the object). The imperfections from ClipSeg segmentation mask makes our model more robust to arbitrary shaped masks. Eq. 2 may then be optimized in the Dreambooth fine-tuning. The learned weights of the Unet 202 and Text Encoder 204 may be stored in association with the unique item identifier. At inference time, when a user selects a particular item, the saved modules (e.g., the learned weights of the UNet 202 and/or the text encoder 204 for the user-selected item) may be loaded into the Stable Diffusion Inpaint Model 208. As shown in FIG. 2, the user has selected a white couch. Weights for the UNet 202 and text encoder 204 have been learned (either upon user-selection of the couch or previously) using three images of the couch (e.g., from an online catalog listing for the couch) and the text "A photo of [token] couch" where [token] represents the unique identifier for the selected couch (e.g., the selected virtual item) and where "couch" represents the class of the selected virtual item. The class may be determined automatically from metadata associated with the virtual item (e.g., a general ledger category of the item in an online catalog). Accordingly, the text 240 may be automatically generated during the fine-tuning. Once the UNet 202 and/or text encoder 204 are fine-tuned using the images for the selected virtual item and the text 240, the learned weights are stored in association with the identifier data (e.g., the token) for the selected virtual item.

During inference, a user may select the item (e.g., from an online catalog). In the current example, the user may be interested in the couch shown in FIG. 2 and may select the couch for virtual try-on. The user may provide input image 210 (e.g., an image of a room in which the user is considering placing the couch). The user may generate masked input image 212 by specifying a location of the masked region 226 (e.g., by clicking and/or drawing on the input image 210 to select the area to be masked). In other examples, the user may use user-input text (e.g., "red couch") to mask an object in the room and the model may automatically determine the location of the object to be masked (as previously described). The weights learned for the selected item may be loaded (action 206) onto the Stable Diffusion inpaint model 208 (or onto another latent diffusion inpainting model or other generative model, according to the desired implementation) and the input image 210, the masked input image 212, the text 240 (which may be auto-generated) may be input into the model. The model may generate output image data 250. Note that in output image data 250 a highly-realistic representation of the selected couch is inpainted in the user's input image 210, albeit at a different orientation than was seen in any of the training images of the selected couch.

Figure 3:
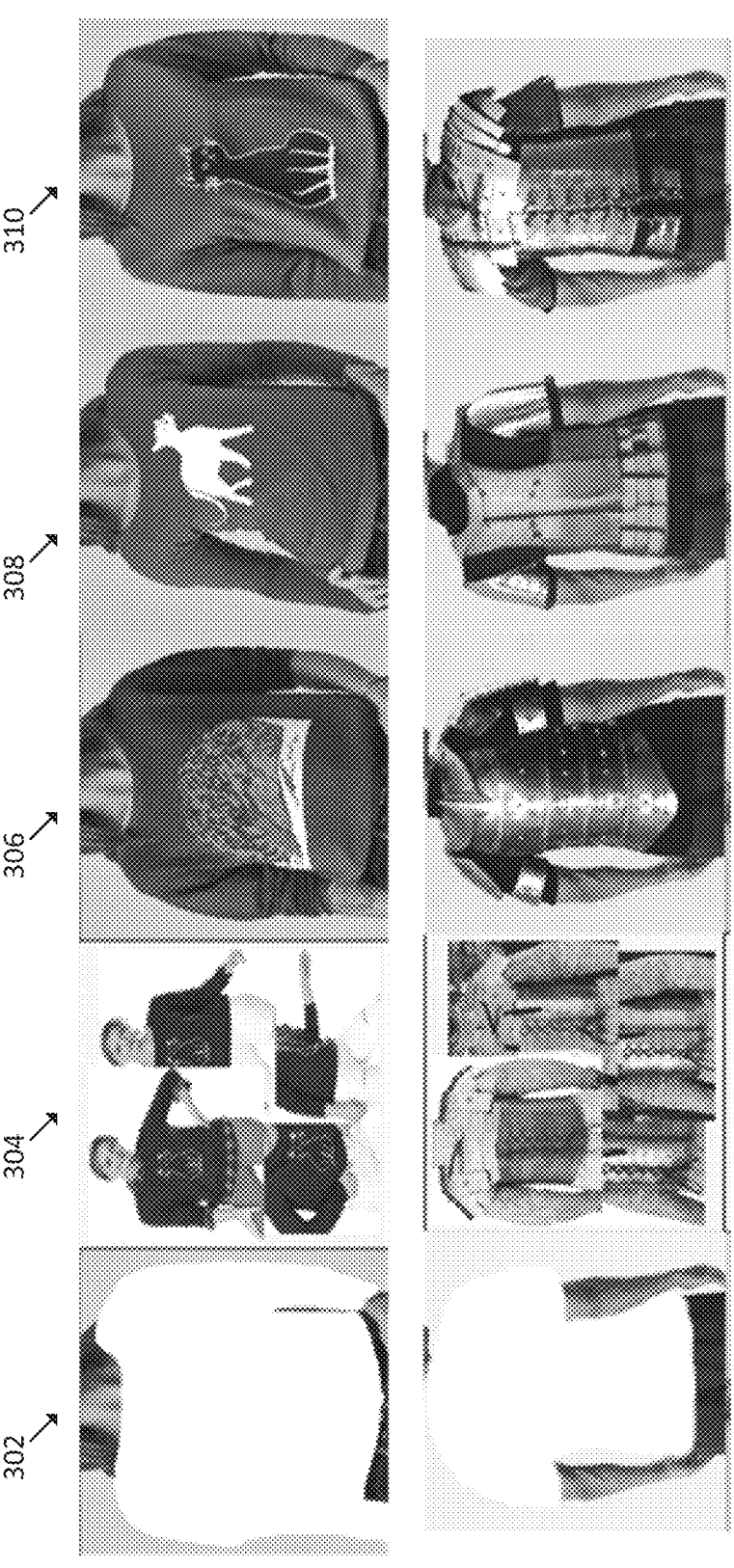
FIG. 3 depicts various inpainting examples using different machine learning architectures, in accordance with various aspects of the present disclosure.

FIG. 3 depicts various inpainting examples using different machine learning architectures, in accordance with various aspects of the present disclosure. In FIG. 3, column 302 represents two masked input images for virtual try-on (of clothing in the depicted examples). In the examples, the user may have drawn a mask on their uploaded input images to mask out the shirt that they are currently wearing with a shirt (or armor in the example depicted in the bottom row) that they are considering. In other examples, the mask may be auto-generated using an object detection/segmentation approach, as previously described.

Column 304 represents images of the selected virtual item. For example, these may be images of the particular shirt (top row) or armor (bottom row) that the user would like to virtually try-on. Columns 306, 308, and 310 represent the output images generated using three different generative approaches. Specifically, column 306 represents a text-guided latent diffusion model's output (with the input text being a title of the item (e.g., the title of a catalogue entry for the item) in this example), column 308 represents PBE output, and column 310 represents Dreampaint output which uses the various few-shot inpainting techniques described herein.

As can be seen, the generated images in column 306 capture some characteristics of the example images of the selected virtual item; however, in many respects the fine-grained details of the selected virtual item (e.g., a shirt depicting a cat in the top row, and Roman armor in the bottom row) are absent from the representation of the item in the generated image. For example, in the top row of column 306, the shirt does not depict a cat, but instead depicts a tree. In the bottom row of column 306, the armor has a very different-looking style from the armor shown in the images of the selected virtual item (column 304).

Similarly, while PBE (column 308) generally paints similar items on the user-uploaded masked images (from column

302), the fine-grained details of the virtual items are different in the generated output. For example, the cat is white and is shown in a different pose in the top row of column 308, and the armor is lacking the laces and other characteristics in the bottom row of column 308.

Finally, using the Dreampaint architecture described herein, the output images generated in column 310 display a high-fidelity image of the virtual item painted in the user-input image at the location of the mask. Note that the images of the virtual item in the output images of column 310 are highly similar to the images of the selected virtual items shown in column 304.

Figure 4A:
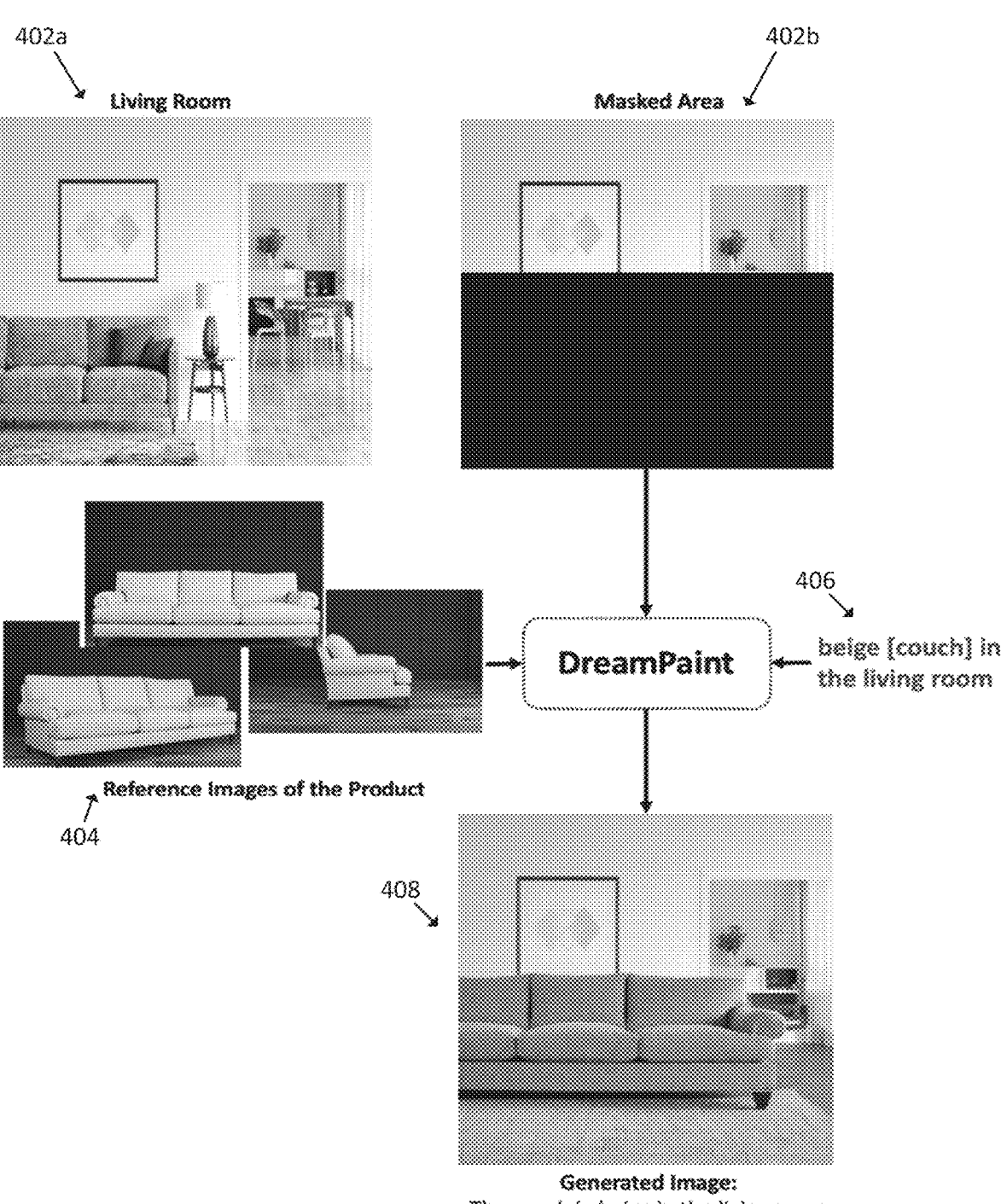
FIG. 4A depicts examples in which a text encoder is used to refine the output of an inpainting model, in accordance with various aspects of the present disclosure.

FIG. 4A depicts examples in which a text encoder is used to refine the output of an inpainting model, in accordance with various aspects of the present disclosure. Image 402a represents a user-input image (of the user's living room) and image 402b represents a masked area of the image (representing an area where the user would like to see the selected couch). In the examples, the user may have drawn a mask on their uploaded input image to mask out the area of their living room in which they would like to see the selected couch (represented by reference images 404). In other examples, the mask may be auto-generated using an object detection/segmentation approach, as previously described.

Reference images 404 represent the images of a particular item for which the few-shot item inpainting model has been fine-tuned (e.g., as described above in reference to FIG. 2). The user may have selected an item represented by the reference images for virtual try-on in the user's living room. In addition, the user may input text 406 ("beige [couch] in the living room") that may be used to fine-tune the output of the inpainting model ("DreamPaint" in FIG. 4A). Accordingly, the user may wish for the couch in the reference images 404 to appear in the image of the user's living room, but with a change in the color (e.g., from white to beige in this example). Accordingly, in the generated image 408, the couch appears in a beige color inpainted in the image of the user's living room.

Figure 4B:
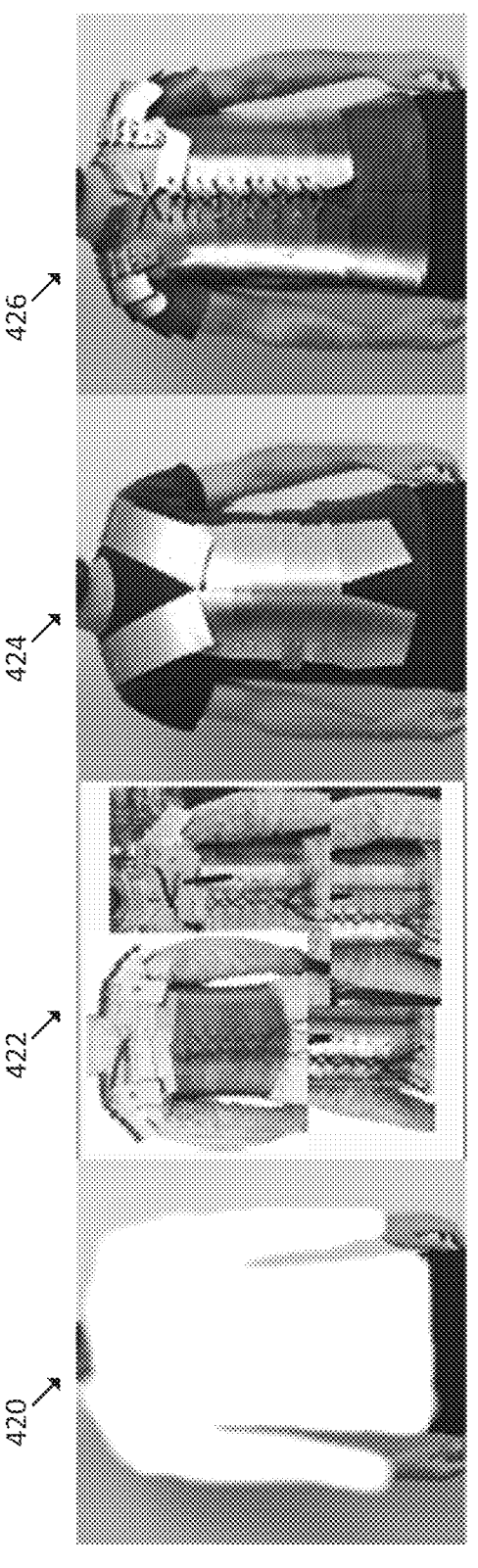
FIG. 4B depicts examples of outputs of an inpainting model with and without a fine-tuned text encoder, in accordance with various aspects of the present disclosure.

FIG. 4B depicts examples of outputs of an inpainting model with and without a fine-tuned text encoder, in accordance with various aspects of the present disclosure. Image 420 is a user-input masked image and reference images 422 represent the images of a particular item for which the few-shot item inpainting model has been fine-tuned (e.g., as described above in reference to FIG. 2). The user may have selected an item represented by the reference images for virtual try-on (a suit of Roman armor, in this example). In the examples in FIG. 4B, output image 424 and 426 are generated using the text input "a [token] roman armor."

Output image 424 represents the output of the architecture of FIG. 2 when the text encoder has not been fine-tuned for the reference item. As shown, the armor appears quite differently from the armor in the reference images 422. Conversely, in output image 426, the text encoder has been fine-tuned for the reference item. As shown, the armor appears very similar to the armor shown in the reference images 422, illustrating the benefit of finetuning both the text encoder 204 and the UNet 202 in FIG. 2.

Figure 5:
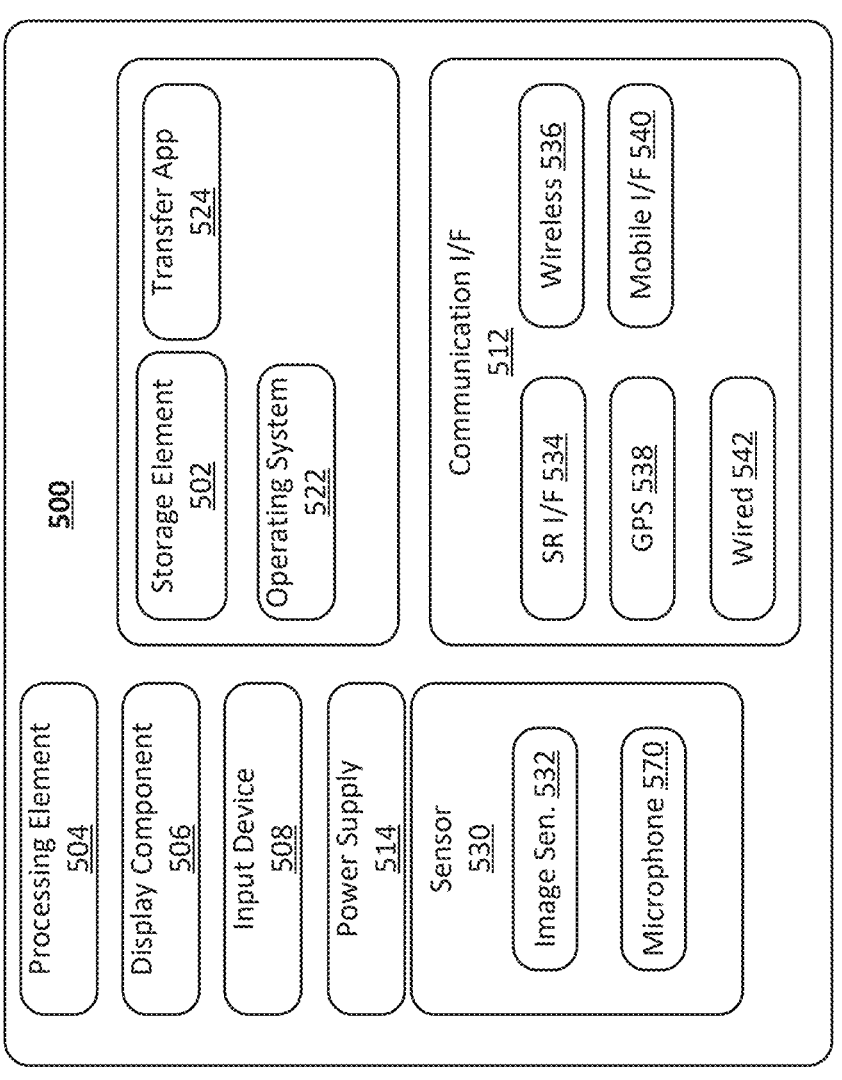
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the latent diffusion models, segmentation-based models, generative models, transformers, encoders, and/or the other models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
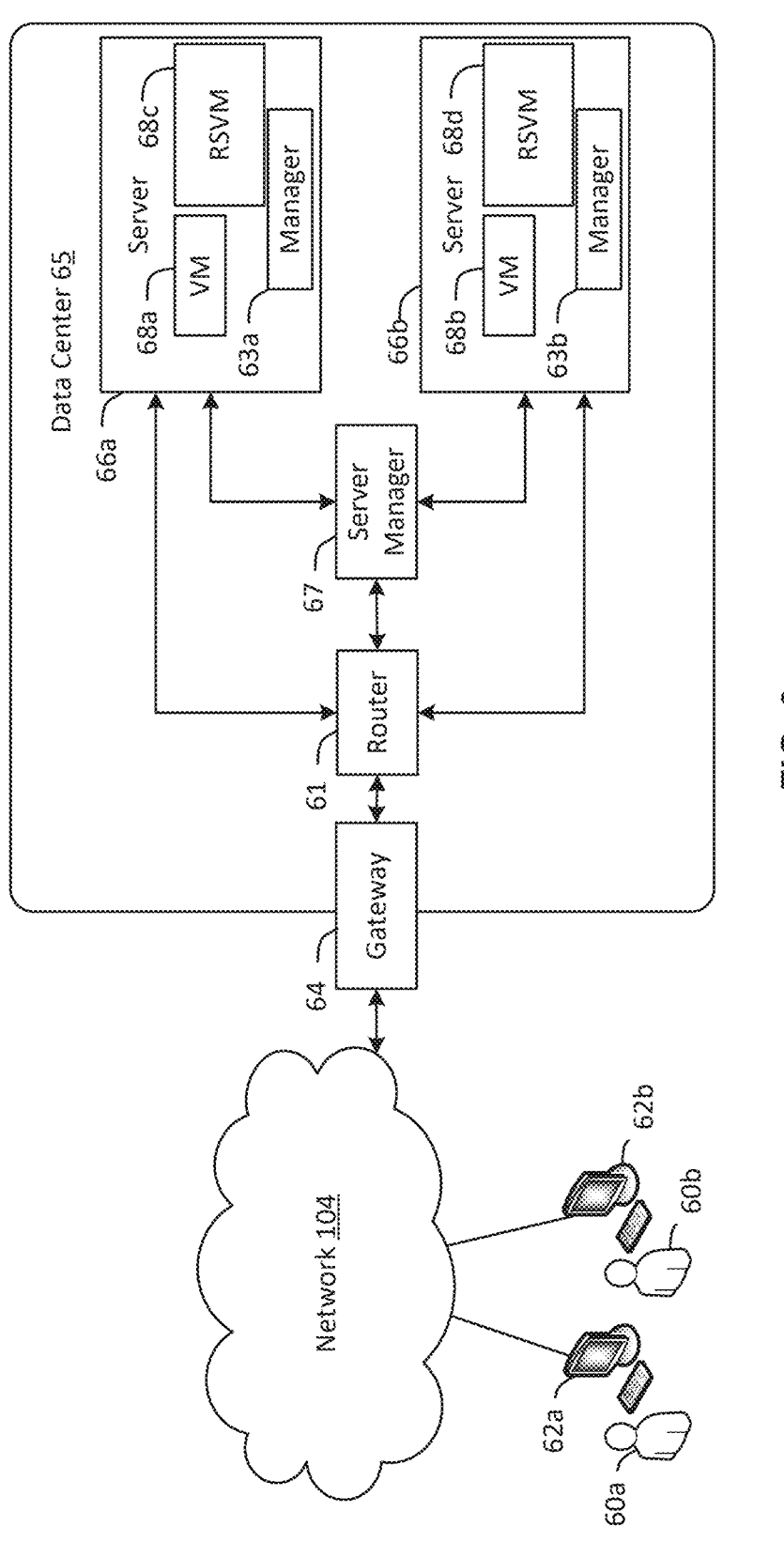
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

FIG. 7 depicts an example process for few-shot item inpainting in input images, in accordance with various aspects of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a selection of a first item is received on a GUI. For example, as shown in FIG. 1, a user may use a search field to search an online catalog to find an item (e.g., furniture, makeup, an article of clothing, a decorative item, etc.) for virtual try-on.

Processing may continue at action 720, at which a first set of weights may be determined. The first set of weights may be for a UNet and/or a text encoder of a generative machine learning model such as a pre-trained latent diffusion model, as described above. In some examples, the first set of weights may be learned by fine-tuning a pre-trained latent diffusion model based at least in part on images of the first item. In some examples, a text prompt may also be used to learn the first set of weights. As previously described, in at least some examples the text prompt may include a unique item identifier (e.g., a token that uniquely identifies the item from among other items) and a class/category of the first item. In addition, in some examples, videos depicting the item may be available. In such instances, various images of the item (e.g., constituent frames of the video) may be used during fine-tuning of the generative machine learning model (e.g., a pre-trained latent diffusion model). In some cases, one or more 3D models of the item may be available. In such cases, camera-images (e.g., from a virtual camera) may be used to capture images of the 3D model of the item from different perspectives. These different images may be used during fine-tuning of the generative machine learning model. In some cases, different perspective images of a 3D model of the item may provide an optimal (or near optimal) set of images with which to fine tune the pre-trained generative machine learning model. Accordingly, in some instances the difference between Dreampaint performance using the various perspective images generated using the 3D model and Dreampaint performance using one or more 2D images (e.g., available catalogue images of the item) may be evaluated, measured, and/or used to improve model selection and/or performance.

Processing may continue at action 730, at which the first set of weights may be loaded on a latent diffusion inpainting model (e.g., Stable Diffusion Inpaint model 208 of FIG. 2). Processing may continue at action 740, at which a user-input image may be received. The user-input image may depict a target environment. For example, for virtual try-on of clothing the image may depict the user (e.g., captured by a camera of the user's mobile device). In a furniture virtual try-on example, the image may be of a room in which a user is considering placing the selected furniture item. It should be noted, that although the various examples described herein typically describe user input images, users may instead input videos and the various techniques described herein may be applied on a frame-by-frame basis. In addition, in some examples, videos depicting the item may be available. In such instances, various images of the item (e.g., constituent frames of the video) may be used during fine-tuning of the Processing may continue at action 750, at which user-defined mask data identifying an area within the user-input image may be received. The mask may be manually selected in the image. For example, a user may use a tool within the GUI to draw an area on the user-input image representing a target area for rendering the virtual item. In other examples, the user may use a text prompt to automatically select an object in the user-input image for replacement by the selected virtual item. For example, the user may be interested in replacing a piece of furniture with a virtual piece of furniture that the user is considering or in replacing an article of clothing worn by the user with a virtual article of clothing. As previously described, in some examples, the user-input image may be subjected to a semantic segmentation model to detect individual objects represented in the image. In such cases, the user may select a segmented item as the mask (e.g., by selecting an icon representing the individual item).

Processing may continue at action 760, at which the user-input image and the user-defined mask data may be input into a latent diffusion inpainting model loaded with the first set of weights. In various further examples, the text prompt for the first item may also be input into the latent diffusion inpainting model.

Processing may continue at action 770, at which the latent diffusion inpainting model may generate a first output image depicting a representation of the first item within the target environment. In various examples, the user may provide clarification and/or refinement using further text prompts in order to generate refined output images by the latent diffusion inpainting model in accordance with the desired output.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:

receiving a selection of a first item on a graphical user interface;

determining a first set of weights associated with the first item, wherein the first set of weights are learned by fine-tuning an encoder of a pre-trained latent diffusion model using randomly-masked images of the first item;

loading the first set of weights into first non-transitory computer-readable memory associated with the pre-trained latent diffusion model;

receiving a first user-input image depicting a target environment;

receiving user-defined mask data identifying an area within the first user-input image;

inputting the first user-input image and the user-defined mask data into the pre-trained latent diffusion model, wherein the pre-trained latent diffusion model is loaded with the first set of weights;

generating, by the pre-trained latent diffusion model, a first output image depicting a representation of the first item within the target environment; and displaying, on the graphical user interface, the first output image.

2. The computer-implemented method of claim 1, further comprising:

determining a second set of weights associated with the first item, wherein the second set of weights are learned by fine-tuning a text encoder of the pre-trained latent diffusion model using a text input describing a type of the first item and first token data uniquely identifying the first item; and in response to receiving the selection of the first item, loading the second set of weights into second non-transitory computer-readable memory associated with a text encoder of the pre-trained latent diffusion model, wherein the user-defined mask data comprises first user-input text describing an object appearing in the first user-input image to be replaced by the first item.

3. The computer-implemented method of claim 2, further comprising:

receiving, in a field of the graphical user interface, second user-input text describing a desired condition of an appearance of the first item; and generating, by the pre-trained latent diffusion model, a second output image depicting a second representation of the first item within the target environment, wherein the second representation corresponds to the desired condition of the appearance of the first item.

4. A method comprising:

receiving, by a first graphical user interface, a first selection of a first item;

determining, based at least in part on the first selection of the first item, a first set of weights learned for a generative machine learning model fine-tuned using at least one image of the first item;

receiving, by the first graphical user interface, first user-input image data representing a target environment; and generating, by the generative machine learning model using the first set of weights, first output image data representing a representation of the first item within the target environment.

5. The method of claim 4, further comprising:

receiving, by the first graphical user interface, first mask data identifying a location in the target environment for replacement by the representation of the first item, wherein the generative machine learning model generates the first output image data further based at least in part on the first mask data.

6. The method of claim 4, further comprising:

receiving, by the first graphical user interface, first text data identifying an object represented in the first user-input image data for replacement by the representation of the first item, wherein the generative machine learning model generates the first output image data further based at least in part on the first text data.

7. The method of claim 4, wherein the generative machine learning model is a pre-trained generative latent representation model, the method further comprising:

generating a plurality of masked images of the first item; and determining the first set of weights associated with the first item based at least in part on the plurality of masked images of the first item.

8. The method of claim 4, further comprising:

storing the first set of weights in non-transitory computer-readable memory in association with first identifier data identifying the first item; and loading the first set of weights based at least in part on the first selection of the first item.

9. The method of claim 4, wherein the generative machine learning model is a pre-trained Stable Diffusion model, the method further comprising:

determining the first set of weights for a UNet of the pre-trained Stable Diffusion model while maintaining weights of a variational autoencoder of the pre-trained Stable Diffusion model.

10. The method of claim 4, further comprising:

receiving, in a field of the first graphical user interface, user-input text describing a first condition of an appearance of the first item; and generating, by the generative machine learning model, a second output image data representing a second representation of the first item within the target environment, wherein the second representation corresponds to the first condition of the appearance of the first item.

11. The method of claim 4, further comprising:

determining, based at least in part on the first selection of the first item, a second set of weights learned for a text encoder of the generative machine learning model, wherein the second set of weights learned for the text encoder are learned based at least in part on the at least one image of the first item, first text data describing a type of the first item, a first identifier data uniquely identifying the first item.

12. The method of claim 4, wherein the generative machine learning model is pre-trained and wherein the first set of weights are learned by updating pre-trained weights of a UNet model of the generative machine learning model using training images consisting of one or more images of the first item.

13. A system comprising:

at least one processor; and non-transitory computer-readable memory storing instructions that, when executed by the at least one processor, are effective to:

receive, at a first graphical user interface, a first selection of a first item;

determine, based at least in part on the first selection of the first item, a first set of weights learned for a generative machine learning model fine-tuned using at least one image of the first item;

receive, by the first graphical user interface, first user-input image data representing a target environment; and generate, by the generative machine learning model using the first set of weights, first output image data representing a representation of the first item within the target environment.

14. The system of claim 13, the non-transitory computer-readable memory storing further instructions that, when executed by the at least one processor, are further effective to:

receive, by the first graphical user interface, first mask data identifying a location in the target environment for replacement by the representation of the first item, wherein the generative machine learning model generates the first output image data further based at least in part on the first mask data.

15. The system of claim 13, the non-transitory computer-readable memory storing further instructions that, when executed by the at least one processor, are further effective to:

receive, by the first graphical user interface, first text data identifying an object represented in the first user-input image data for replacement by the representation of the first item, wherein the generative machine learning model generates the first output image data further based at least in part on the first text data.

16. The system of claim 13, wherein the generative machine learning model is a pre-trained generative machine learning model, the non-transitory computer-readable memory storing further instructions that, when executed by the at least one processor, are further effective to:

generate a plurality of masked images of the first item; and determine the first set of weights associated with the first item based at least in part on the plurality of masked images of the first item.

17. The system of claim 13, the non-transitory computer-readable memory storing further instructions that, when executed by the at least one processor, are further effective to:

store the first set of weights in non-transitory computer-readable memory in association with first identifier data identifying the first item; and load the first set of weights based at least in part on the first selection of the first item.

18. The system of claim 13, wherein the generative machine learning model is a pre-trained Stable Diffusion model, the non-transitory computer-readable memory storing further instructions that, when executed by the at least one processor, are further effective to:

determine the first set of weights for a UNet of the pre-trained Stable Diffusion model while maintaining weights of a variational autoencoder of the pre-trained Stable Diffusion model.

19. The system of claim 13, the non-transitory computer-readable memory storing further instructions that, when executed by the at least one processor, are further effective to:

receive, in a field of the first graphical user interface, user-input text describing a first condition of an appearance of the first item; and generate, by the generative machine learning model, a second output image data representing a second representation of the first item within the target environment, wherein the second representation corresponds to the first condition of the appearance of the first item.

20. The system of claim 13, the non-transitory computer-readable memory storing further instructions that, when executed by the at least one processor, are further effective to:

determine, based at least in part on the first selection of the first item, a second set of weights learned for a text encoder of the generative machine learning model, wherein the second set of weights learned for the text encoder are learned based at least in part on the at least one image of the first item, first text data describing a type of the first item, a first identifier data uniquely identifying the first item.

\* \* \* \* \*